US012686632B2

(12) United States Patent
Fukazawa

(10) Patent No.: US 12,686,632 B2
(45) Date of Patent: Jul. 21, 2026

(54) RADIATION-RESISTANT INORGANIC MATERIAL AND FIBER THEREOF

(71) Applicant: Nippon Fiber Corporation, Abiko-City (JP)

(72) Inventor: Hiroshi Fukazawa, Abiko-City (JP)

(73) Assignee: NIPPON FIBER CORPORATION, Abiko-City (JP)

( * ) Notice: Subject to any disclaimer, the term of this patent is extended or adjusted under 35 U.S.C. 154(b) by 1308 days.

(21) Appl. No.: 17/605,966

(22) PCT Filed: Apr. 22, 2020

(86) PCT No.: PCT/JP2020/017362
§ 371 (c)(1),
(2) Date: Oct. 22, 2021

(87) PCT Pub. No.: WO2020/218356
PCT Pub. Date: Oct. 29, 2020

(65) Prior Publication Data
US 2022/0177350 A1 Jun. 9, 2022

(30) Foreign Application Priority Data

Apr. 25, 2019 (JP) ................................. 2019-083950
Oct. 9, 2019 (JP) ................................. 2019-039911

(51) Int. Cl.
| | |
|---|---|
| *C03C 3/087* | (2006.01) |
| *C03C 4/00* | (2006.01) |
| *C03C 13/06* | (2006.01) |
| *C04B 14/42* | (2006.01) |
| *G21F 1/06* | (2006.01) |
| *C04B 111/00* | (2006.01) |

(52) U.S. Cl.
CPC .............. *C03C 13/06* (2013.01); *C03C 3/087* (2013.01); *C03C 4/0042* (2013.01); *C04B 14/42* (2013.01); *G21F 1/06* (2013.01); *C03C 2213/00* (2013.01); *C04B 2111/00258* (2013.01)

(58) Field of Classification Search
CPC .......... C03C 3/087; C03C 13/00; C03C 13/06
See application file for complete search history.

(56) References Cited

U.S. PATENT DOCUMENTS

| | | | | |
|---|---|---|---|---|
| 2008/0191179 A1* | 8/2008 | Bernard | .................. | C03C 13/00 501/36 |
| 2009/0312171 A1* | 12/2009 | Tanaka | ..................... | C04B 14/42 501/63 |
| 2016/0097125 A1* | 4/2016 | Tavares | .................. | B05D 3/061 428/407 |

FOREIGN PATENT DOCUMENTS

| | | | | |
|---|---|---|---|---|
| CN | 109626833 A | 4/2019 | | |
| EP | 0 159 173 A2 | 10/1985 | | |
| EP | 159173 A | * 10/1985 | ............. | C03C 1/002 |
| JP | 60-231440 A | 11/1985 | | |
| JP | 10-167754 A | 6/1998 | | |
| JP | H10167754 A | * 6/1998 | | |
| JP | 2009-531651 A | 9/2009 | | |
| WO | WO 2008/060292 A2 | 5/2008 | | |

OTHER PUBLICATIONS

International Search Report, issued in PCT/JP2020/017362, dated Jul. 28, 2020.
Romero-Perez et al., "Magnetic properties of glasses with high iron oxide content", Materials Research Bulletin, 2001, vol. 36, pp. 1513-1520.
Written Opinion of the International Searching Authority, issued in PCT/JP2020/017362, dated Jul. 28, 2020.
Chinese Office Action and Search Report for Chinese Application No. 202080030765.3, dated Apr. 19, 2023, with an English translation.
Extended European Search Report for European Application No. 20793978.6, dated Jun. 26, 2023.
Hayward, "The use of glass ceramics for immobilising high level wastes from nuclear fuel recycling," Glass Technology, vol. 29, No. 4, 1988, pp. 122-136.
Russian Office Action and Search Report for Russian Application No. 2021126585/03, dated Jun. 28, 2023, with an English translation.

* cited by examiner

*Primary Examiner* — Elizabeth A. Bolden
(74) *Attorney, Agent, or Firm* — Birch, Stewart, Kolasch & Birch, LLP

(57) ABSTRACT

An inorganic material including $SiO_2$, $Al_2O_3$, CaO, and $Fe_2O_3$ as components, in which the mass percentages of the components in terms of oxide in the inorganic material are set as follows: i) the total content of $SiO_2$ and $Al_2O_3$ is from 40% by mass to 70% by mass; ii) the ratio $Al_2O_3/(SiO_2+Al_2O_3)$ (mass ratio) is in the range of 0.15 to 0.40; iii) the content of $Fe_2O_3$ is from 16% by mass to 25% by mass; and iv) the content of CaO is from 5% by mass to 30% by mass, can be produced as an inorganic material having excellent melt spinnability and excellent radiation resistance.

23 Claims, 5 Drawing Sheets

RADIATION-RESISTANT INORGANIC MATERIAL AND FIBER THEREOF

TECHNICAL FIELD

The present invention relates to a novel inorganic material having excellent radiation resistance and a fiber thereof. More particularly, the invention relates to a radiation-resistant inorganic material having excellent melt spinnability and a fiber thereof.

BACKGROUND ART

Due to the major earthquakes that struck East Japan in March 2011 (Great East Japan Earthquake), nuclear power plants were devastated, and enormous efforts and resources have been forcibly put in for reactor decommissioning and radioactive waste disposal.

On the other hand, after the Great East Japan Earthquake, safety regulations for nuclear reactors have been tightened, and as a result, many nuclear power plants have been shut down, while the proportion of thermal power generation is increasing. Coal is heavily used as fuel for thermal power generation, and a large amount of fly ash is generated as a result. Fly ash has been traditionally disposed of as a waste material; however, in recent years, fly ash has been increasingly utilized as a concrete admixture, and as a result, the amount of discarded fly ash has been decreasing. However, most of the uses of fly ash occur in the cement industry and there is concern that when the demand for cement stagnates, the amount of fly ash to be disposed of may start to increase again. For this reason, developing new applications for fly ash has become an urgent issue. Incidentally, the composition of fly ash varies depending on the composition of the raw material coal and the place of origin thereof (power plant and country).

As an example of advanced utilization of fly ash, for example, JP H6-316815 A (hereinafter, Patent Document 1) discloses a fly ash fiber characterized by containing 20% to 40% of $Al_2O_3$, 35% to 50% of $SiO_2$, 15% to 35% of CaO, 3% to 12% of $Fe_2O_3$, and 2% to 5% of MgO. In the same document, it is described that "the content of $Fe_2O_3$ contained in the fly ash fiber is 3% to 12%. It is desirable that this content is as small as possible. Furthermore, when the content of $Fe_2O_3$ increases, the degree of coloration of the fly ash fiber increases, which is undesirable. As a result, a content of $Fe_2O_3$ of 12% or more is problematic and must be avoided" (ibid., paragraph [0054]).

In addition to fly ash fibers, for example, regarding mineral fibers, JP 2018-531204 A (hereinafter, Patent Document 2) discloses a mineral fiber including $Al_2O_3$, $SiO_2$, CaO, MgO, and $Fe_2O_3$ as components, characterized in that the content of $Fe_2O_3$ is 5% to 15%. In the same document, it is described that "an increase in the iron content tends to cause coloration of mineral fibers, and this increase is not preferable for an application in which a mineral fiber maintains a visible state" (ibid., paragraph [0005]).

Patent Document 1 and Patent Document 2 have in common that $Al_2O_3$, $SiO_2$, CaO, and $Fe_2O_3$ are used as essential components, and it is described to the effect that the content of $Fe_2O_3$ should be limited to a predetermined amount or less (12% or less in Patent Document 1, and 15% or less in Patent Document 2).

In addition to this, JP S60-231440 A (hereinafter, Patent Document 3) and JP H10-167754 (hereinafter, Patent Document 4) disclose a glass and a vitrified material characterized in that the materials contain $Al_2O_3$, $SiO_2$, CaO, and $Fe_2O_3$ as essential components, and that the content of each of the oxide components is in a specific range.

In addition to that, in Materials Research Bulletin, 36 (2001), 1513-1520 (hereinafter, Non-Patent Document 2), the relationship between the content of iron oxide ($Fe_2O_3$) and magnetism in a sample obtained from goethite (FeOOH) industrial waste is described.

Meanwhile, none of Patent Documents 1, 2, 3, and 4 and Non-Patent Document 2 mention radiation resistance.

However, as previously mentioned, radiation-resistant materials are essential for the treatment of damaged nuclear power generation facilities and the treatment of radiation-contaminated waste, radiation-contaminated surplus soil or the treatment of radioactive waste.

As a radiation-resistant material, attention has been drawn to basalt fibers produced from basalt as a raw material; however, as far as the inventors are aware, there is no document discussing the relationship between the composition of the basalt fibers and radiation resistance. Meanwhile, in the Chronological Scientific Tables (hereinafter, Non-Patent Document 1), the types and compositions of basalt are introduced as follows (Table 1).

TABLE 1

| <Type and composition basalt, source: Chronological Scientific Tables> | | | | | |
| --- | --- | --- | --- | --- | --- |
| Component | Alkali basalt | Flood basalt | Oceanic island basalt | Abyssal basalt | Island arc basalt |
| $SiO_2$ | 45.4 | 50.01 | 50.51 | 50.68 | 51.9 |
| $Al_2O_3$ | 14.7 | 17.08 | 13.45 | 15.6 | 16 |
| $Fe_2O_3$ | 4.1 | — | 1.78 | — | — |
| FeO | 9.2 | 10.01 | 9.59 | 9.85 | 9.56 |
| CaO | 10.5 | 11.01 | 11.18 | 11.44 | 11.8 |
| MnO | — | 0.14 | 0.17 | — | 0.17 |
| MgO | 7.8 | 7.84 | 7.41 | 7.69 | 6.77 |
| $TiO_2$ | 3 | 1 | 2.63 | 1.49 | 0.8 |
| $Na_2O$ | 3 | 2.44 | 2.28 | 2.66 | 2.42 |
| $K_2O$ | 1 | 0.27 | 0.49 | 0.17 | 0.44 |
| $P_2O_5$ | — | 0.19 | 0.28 | 0.12 | 0.11 |
| Total | 98.7 | 99.99 | 99.77 | 99.7 | 100 |

In addition to this, in a review article for basalt fibers (International Journal of Textile Science, 2012, 1(4): 19-28, Non-Patent Document 3), the representative composition of basalt is described as $SiO_2$: 52.8%, $Al_2O_3$: 17.5%, $Fe_2O_3$: 10.3%, and CaO: 8.59%.

CITATION LIST

Patent Document

Patent Document 1: JP H6-316815 A
Patent Document 2: JP 2018-531204 A
Patent Document 3: JP S60-231440 A
Patent Document 4: JP H10-167754 A

Non-Patent Document

Non-Patent Document 1: Chronological Scientific Tables, 2019 Edition (edited by National Astronomical Observatory)
Non-Patent Document 2: Materials Research Bulletin, 36 (2001) 1513-1520
Non-Patent Document 3: International Journal of Textile Science, 2012, 1(4): 19-28

SUMMARY OF THE INVENTION

Problem to be Solved by the Invention

As described above, as far as the inventors of the present invention are informed, there has been no study conducted for the purpose of enhancing the radiation resistance of inorganic materials including $SiO_2$, $Al_2O_3$, and $Fe_2O_3$ as main components.

Thus, for the purpose of enhancing radiation resistance, the present inventors worked on the improvement of radiation resistance of an inorganic material including $SiO_2$, $Al_2O_3$, and $Fe_2O_3$ as main components, and particularly on the development of a radiation-resistant inorganic material having excellent melt spinnability.

Means for Solving the Problem

As a result, the inventors found that with regard to an inorganic material containing $SiO_2$ and $Al_2O_3$ as main components, when the sum of $SiO_2$ and $Al_2O_3$ is in a specific range, the proportion of $Al_2O_3$ in the sum of $SiO_2$ and $Al_2O_3$ is in a specific range, and the inorganic material contains a specific amount of each of $Fe_2O_3$ and CaO, the inorganic material has excellent radiation resistance and excellent melt spinnability, and consequently, the inventors developed a material suitable for a part to be irradiated with radiation.

That is, the present invention is an inorganic material suitable for a part to be irradiated with radiation, the inorganic material including $SiO_2$, $Al_2O_3$, CaO, and $Fe_2O_3$ as components, wherein the respective mass percentages of the components in terms of oxide in the inorganic material are as follows:

i) the total content of $SiO_2$ and $Al_2O_3$ is from 40% by mass to 70% by mass;

ii) the proportion (mass ratio) occupied by $Al_2O_3$ in the sum of $SiO_2$ and $Al_2O_3$ is in the range of 0.15 to 0.40;

iii) the content of $Fe_2O_3$ is from 16% by mass to 25% by mass; and iv) the content of CaO is from 5% by mass to 30% by mass.

Hereinafter, the above-described conditions i) to iv) may be simply described as "four requirements of the present invention related to the composition".

A specific example of the part to be irradiated with radiation, where the inorganic material of the present invention is used, will be described below.

According to the present invention, no substantial difference is observed between the component ratio of various raw materials in a formulated mixture and the component ratio of various raw materials in the material obtained after melting the mixture. Therefore, the component ratio in the formulated mixture can be regarded as the material component ratio.

With regard to the inorganic material of the present invention, the formulating proportions of raw materials are adjusted such that the proportions of $SiO_2$, $Al_2O_3$, $Fe_2O_3$, and CaO in the components are within the above-described ranges, and then the mixture is melted to obtain a final inorganic material.

As will be described below, when the raw materials are formulated such that the formulating proportions are within the above-described ranges, the raw materials are melted at a temperature that is not excessively high, and since the molten product is appropriately viscous, the molten product has excellent melt spinnability. Furthermore, the resulting inorganic material has superior radiation resistance.

The total content of $SiO_2$ and $Al_2O_3$ in the inorganic material of the present invention is from 40% by mass to 70% by mass. In the following description, $SiO_2$ may be abbreviated to "component S", and the content of $SiO_2$ may be indicated as "[S]". Similarly, $Al_2O_3$ may be abbreviated to "component A", and the content of $Al_2O_3$ may be indicated as "[A]". When the sum of [S] and [A] is outside the above-described range, that is, either less than 40% by mass or more than 70% by mass, the material may have a higher melting temperature, the molten product may have a higher viscosity, or in contrast, the melt viscosity may become too low, so that the melt spinnability may be deteriorated.

With regard to the inorganic material of the present invention, it is required that the proportion occupied by $Al_2O_3$ in the sum of $SiO_2$ and $Al_2O_3$ ([A]/([A]+[S])) (mass ratio) is in the range of 0.15 to 0.40. Even from this requirement, when the proportion is out of the above-described range, that is, either less than 0.15 or more than 0.40, the material may have inferior melt spinnability.

With regard to the inorganic material of the present invention, it is required that the content of $Fe_2O_3$ is from 16% by mass to 25% by mass. When the content of $Fe_2O_3$ is less than 16% by mass, the material has inferior radiation resistance. On the other hand, when the content thereof is more than 25% by mass, the molten product becomes excessively viscous, and a thread is not likely to be formed. Hereinafter, $Fe_2O_3$ may be abbreviated to "component F", and the content of $Fe_2O_3$ may be indicated as "[F]".

With regard to the inorganic material of the present invention, it is preferable that the content of CaO is from 5% by mass to 30% by mass. When the content of CaO is less than 5% by mass, the melting initiation temperature of the material becomes high, and it is not preferable from the viewpoint of energy saving. The content of CaO is preferably 10% by mass or more. On the other hand, when the content thereof is more than 30% by mass, viscosity of the molten product is too low, and a thread is not likely to be formed. Hereinafter, CaO may be abbreviated to "component C", and the content of CaO may be indicated as "[C]".

On the occasion of obtaining the inorganic material of the present invention, there are no limitations on the raw materials as long as the proportions of $SiO_2$, $Al_2O_3$, $Fe_2O_3$, and CaO are within the above-described ranges.

Therefore, each of the single compounds of $SiO_2$, $Al_2O_3$, $Fe_2O_3$, and CaO may be prepared and used as starting raw materials; however, it is preferable from the viewpoint of the raw material cost that a silica source rich in $SiO_2$ content, an alumina source rich in $Al_2O_3$ content, an iron oxide source rich in $Fe_2O_3$ content, and a calcium oxide source rich in CaO content are formulated to be used as starting raw materials.

Examples of the silica source include, but are not limited to, amorphous silica, silica sand, fumed silica, and volcanic ash.

Examples of the alumina source include, but are not limited to, alumina, mullite, and other minerals.

Examples of a substance that can serve as a silica source as well as an alumina source (silica alumina source) include, but are not limited to, kaolinite, montmorillonite, feldspar, and zeolite.

Examples of the iron oxide source include, but are not limited to, iron oxide, iron hydroxide, and iron ore.

Examples of the calcium oxide source include, but are not limited to, calcium carbonate, calcite, dolomite, and other minerals.

In addition to the above-described substances, thermal power generation waste or metal refining waste can also be effectively utilized as one of the silica source, the alumina source, the iron oxide source, and the calcium oxide source.

Fly ash or clinker ash can be used as the thermal power generation waste. Since fly ash and clinker ash include $SiO_2$ and $Al_2O_3$ in abundance, these ashes are suitable as silica alumina sources. Above all, since fly ash and clinker ash have low $Fe_2O_3$ contents, it is difficult to obtain the inorganic material of the present invention from those ashes alone. However, the inorganic material of the present inventions can be obtained at low cost by additionally incorporating an appropriate amount of an iron oxide source. Meanwhile, since the Coal Gasification Slag (CGS) produced as waste of the Integrated coal Gasification Combined Cycle (IGCC) also has a chemical composition that is almost equivalent to that of fly ash, the coal gasification slag can serve as a silica alumina source. Since the coal gasification slag is in the form of granules, it has an advantage of having excellent handleability.

Examples of the previously mentioned metal refining waste include iron and steel slag and copper slag.

Since the iron and steel slag has a large CaO content, this slag can be used as a calcium oxide source. The iron and steel slag includes blast furnace slag, converter slag and reducing slag.

Since copper slag has a large $Fe_2O_3$ content, copper slag can be used as an iron oxide source.

Therefore, appropriately, fly ash, clinker ash, or coal gasification slag can be used as a silica alumina source, copper slag can be used as an iron oxide source, and iron and steel slag can be used as a calcium oxide source. According to a preferred embodiment, most of the silica alumina source, the iron oxide source, and the calcium oxide source can be covered by industrial waste.

In addition to this, volcanic rocks represented by basalt and andesite can also be utilized as the silica alumina source.

With regard to the inorganic material of the present invention, the incorporation of unavoidable impurities that are included in the raw materials is not excluded. Examples of such impurities include MgO, $Na_2O$, $K_2O$, $TiO_2$, and $CrO_2$.

Since the inorganic material of the present invention is highly amorphous, a fiber that has been processed by melt spinning hardly undergoes a decrease in strength, which is attributable to delamination of a crystal phase-amorphous phase interface, and a high-strength fiber can be obtained.

Here, the degree of amorphization, which is a measure of amorphousness, is calculated by the following Mathematical Formula (1) based on the X-ray diffraction (XRD) spectrum.

$$\text{Degree of amorphization (\%)} = [Ia/(Ic+Ia)] \times 100 \quad (1)$$

wherein in Formula (1), Ic represents the sum of integral values of the scattering intensity of a crystalline peak when the inorganic material is subjected to X-ray diffraction analysis; and Ia represents the sum of integral values of the scattering intensity of an amorphous halo.

The degree of amorphization of the inorganic material of the present invention may vary depending on the composition of the inorganic material; however, the degree of amorphization usually represents a value of 90% or more. When the degree of amorphization is high, the value may even reach 95% or more, and when the degree of amorphization is highest, the fiber is substantially formed only from an amorphous phase. Here, being substantially formed only from an amorphous phase implies that in the X-ray diffraction pattern, only an amorphous halo is observed, and a peak of the crystal phase is not observed.

The radiation resistance of a material formed from the inorganic material of the present invention can be known by comparing the Vickers hardness obtained before and after irradiation of the material with radiation. In addition to this, evaluation of radiation resistance is also enabled by comparing the tensile strength and the porosity in the material obtained before and after radiation exposure. For the measurement of the porosity in the material, a positron annihilation method can be employed.

Effect of the Invention

When compared to existing inorganic materials including $SiO_2$, $Al_2O_3$, CaO, and $Fe_2O_3$ as components, since the inorganic material of the present invention is such that the sum of $SiO_2$ and $Al_2O_3$, the proportion occupied by $Al_2O_3$ in the sum of $SiO_2$ and $Al_2O_3$, the content of $Fe_2O_3$, and the content of CaO are in specific ranges, the inorganic material has excellent radiation resistance and has excellent melt spinnability.

MODE(S) FOR CARRYING OUT THE INVENTION

Figure 1:
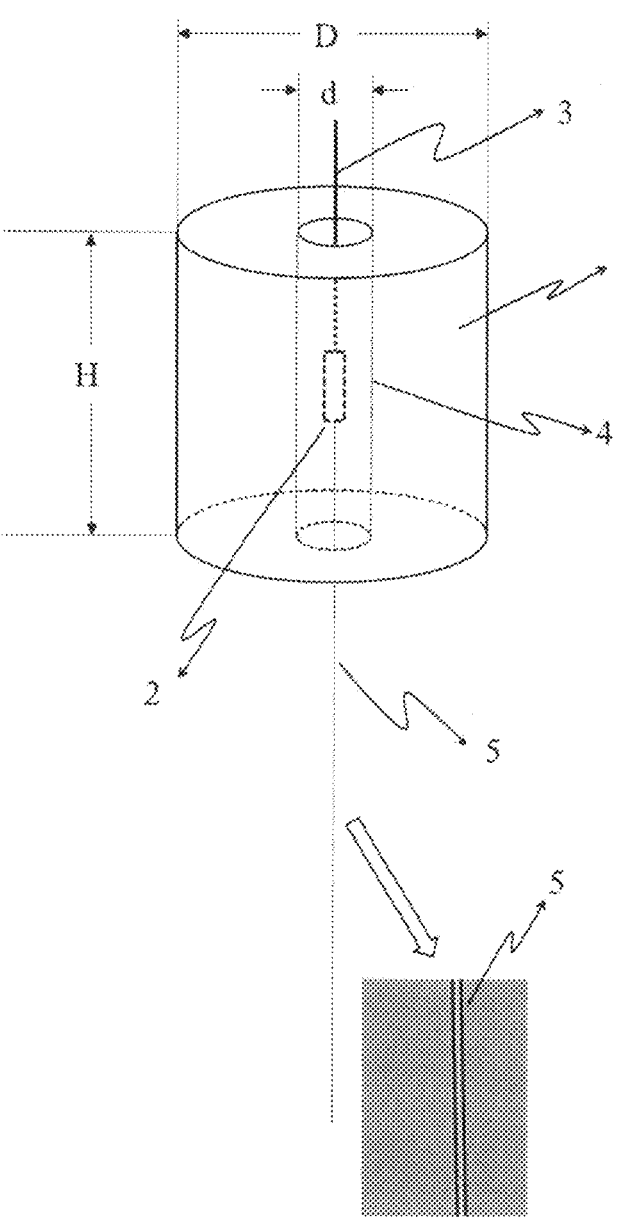
FIG. 1 is a schematic explanatory diagram showing a summary of an evaluation test for melt spinnability of an inorganic material of the present invention, together with a magnified view of a melt-spun fiber.

In the following description, the contents of the present invention will be specifically described by way of Test Examples.

In the following Test Examples (Examples and Comparative Examples), the following were used as the silica source, alumina source, silica alumina source, iron oxide source, and calcium oxide source.

<Silica Source>
  Silicon dioxide: Reagent (will be described as $SiO_2$ (reagent) in the following Tables 6 to 9)
<Alumina Source>
  Aluminum oxide: Reagent (will be described as $Al_2O_3$ (reagent) in the following Tables 6 to 9)
<Iron Oxide Source>
  Iron(III) oxide: Reagent (will be described as $Fe_2O_3$ (reagent) in the following Tables 6 to 9)
  Copper slag: Copper slag produced at a copper smelter in Japan (will be described as FA(10) in the following Table 3)

<Calcium Oxide Source>

Calcium oxide: Reagent (will be described as CaO (reagent) in the following Tables 6 to 9)

Blast furnace slag: Blast furnace slag produced at an ironworks in Japan (will be described as FA(13) in the following Table 3)

Reducing slag: Reducing slag produced at an ironworks in Japan (will be described as FA(14) in the following Table 3)

<Silica Alumina Source>

Fly ash: 12 types of samples discharged from thermal power plants in Japan (will be described as FA(1) to FA(9) and FA(12) in the following Tables 2 and 3)

Coal gasification slag: A sample discharged from an integrated coal gasification combined cycle plant in Japan (will be described as FA(11) in the following Table 3)

Volcanic rocks: Basalt-based rocks having specifically large iron oxide contents, collected in Akita Prefecture and Fukui Prefecture (will be described as BA(1) and BA(2) in the following Table 4)

The compositions of the above-described FA(1) to FA(14), BA(1), and BA(2) are shown in Tables 2, 3, and 4. The component analysis was based on a fluorescence X-ray analysis method.

TABLE 2

| | | | <Fly ash composition, unit: % by mass> | | | |
|---|---|---|---|---|---|---|
| Component | FA (1) | FA (2) | FA (3) | FA (4) | FA (5) | FA (6) |
| $Fe_2O_3$ [F] | 10 | 5 | 5 | 9 | 10 | 14 |
| $SiO_2$ [S] | 53 | 61 | 57 | 72 | 51 | 59 |
| $Al_2O_3$ [A] | 13 | 25 | 18 | 11 | 18 | 25 |
| CaO [C] | 17 | 0 | 3 | 3 | 12 | 1 |
| Others | 7 | 9 | 17 | 5 | 9 | 1 |

TABLE 3

| | | | | <Fly ash, slag compositions, unit: % by mass> | | | | |
|---|---|---|---|---|---|---|---|---|
| Component | FA (7) | FA (8) | FA (9) | FA (10) | FA (11) | FA (12) | FA (13) | FA (14) |
| $Fe_2O_3$ [F] | 9 | 13 | 15 | 55 | 9 | 1 | 0 | 1 |
| $SiO_2$ [S] | 62 | 60 | 59 | 35 | 54 | 73 | 34 | 19 |
| $Al_2O_3$ [A] | 18 | 15 | 15 | 5 | 11 | 22 | 13 | 17 |
| CaO [C] | 3 | 5 | 3 | 2 | 17 | 0 | 42 | 55 |
| Others | 8 | 7 | 8 | 3 | 9 | 4 | 11 | 8 |
| Remarks | | | | Copper slag | Coal gasification slag | | Blast furnace slag | Reducing slag |

TABLE 4

| <Volcanic rock composition, unit: % by mass> | | |
|---|---|---|
| Component | BA(1) | BA(2) |
| $Fe_2O_3$ [F] | 19 | 18 |
| $SiO_2$ [S] | 46 | 25 |
| $Al_2O_3$ [A] | 11 | 10 |
| CaO [C] | 17 | 3 |
| Others | 7 | 44 |

<Preparation of Powdered Raw Materials>

In the following Test Example, each of the silica source, alumina source, iron oxide source, and calcium source is finely pulverized, the sources are mixed such that $SiO_2$, $Al_2O_3$, $Fe_2O_3$ and CaO are included at predetermined proportions, and the mixture is used for the test.

<Evaluation of Melt Spinnability>

Furthermore, the evaluation of melt spinnability of the formulation is based on a melt spinning test using an electric furnace. An outline of the test is shown in FIG. 1. In FIG. 1, an electric furnace (1) has a height (H) of 60 cm and an outer diameter (D) of 50 cm and comprises an opening (4) having a diameter (d) of 10 cm at the center. On the other hand, 30 g of the formulation is introduced into a Tammann tube (2) having an inner diameter (4)) of 2.1 cm and a length of 10 cm. At the center of the bottom of the Tammann tube (2), a hole having a diameter of 2 mm is opened. During a melting test, the Tammann tube (2) is retained at a predetermined position in the opening (4) of the electric furnace using a hanging rod (3).

When the formulation is melted by heating, the formulation flows and drops from the bottom of the Tammann tube due to its own weight and is solidified upon coming into contact with outside air to become a fiber.

The electric furnace is heated by a predetermined temperature increase program, and the highest attainable temperature inside the furnace is set to 1350° C. At this time, it has been confirmed in advance that the temperature inside the Tammann tube (molten product) conforms to a temperature lower by almost 50° C. than the temperature inside the furnace.

In the present invention, as an indicator for evaluating melt spinnability, the state in which the molten product flows and drops to form a thread until the temperature inside the furnace reaches 1350° C., that is, the state in which the melting temperature of the sample is 1300° C. or lower, and the molten product has a melt viscosity appropriate for forming a thread, was considered an acceptable level. The melt behavior of the samples is roughly classified into the following groups represented by A to D.

<Evaluation Ranking>

A: A thread is formed.

B: The molten and softened sample just appears from the bottom of the Tammann tube; however, the viscosity is so high that the sample does not drop by its own weight alone, and a thread is not formed.

C: Because melting of the sample is not initiated, or melting occurs insufficiently, nothing comes out from the bottom of the Tammann tube.

D: Although the sample melts, the melt viscosity of the molten product is too low, the sample becomes liquid droplets and just drips, and a thread is not formed.

<Heat Resistance Test>

An inorganic fiber formed from the material of the present invention is excellent in terms of heat resistance. For the evaluation of heat resistance, a differential thermal analysis (DTA) was performed.

[Tentative Experiment]

A silica source, an alumina source, an iron oxide source, and a calcium oxide source were appropriately formulated, and then four kinds of samples having different contents of $SiO_2$, $Al_2O_3$, $Fe_2O_3$, and CaO were prepared and used for a melt spinning test. Samples 3 and 4 satisfied all of the requirements of the present invention described previously; however, samples 1 and 2 do not satisfy the requirement iii) related to the $Fe_2O_3$ content (Table 5).

All of the samples exhibited satisfactory melt spinnability. The obtained fiber samples were subjected to a radiation exposure test using cobalt 60 as a radiation source under the conditions of a gamma ray irradiation dose of 50 kGy, the tensile strengths before and after irradiation were measured, and the retention rate was determined.

Figure 3:
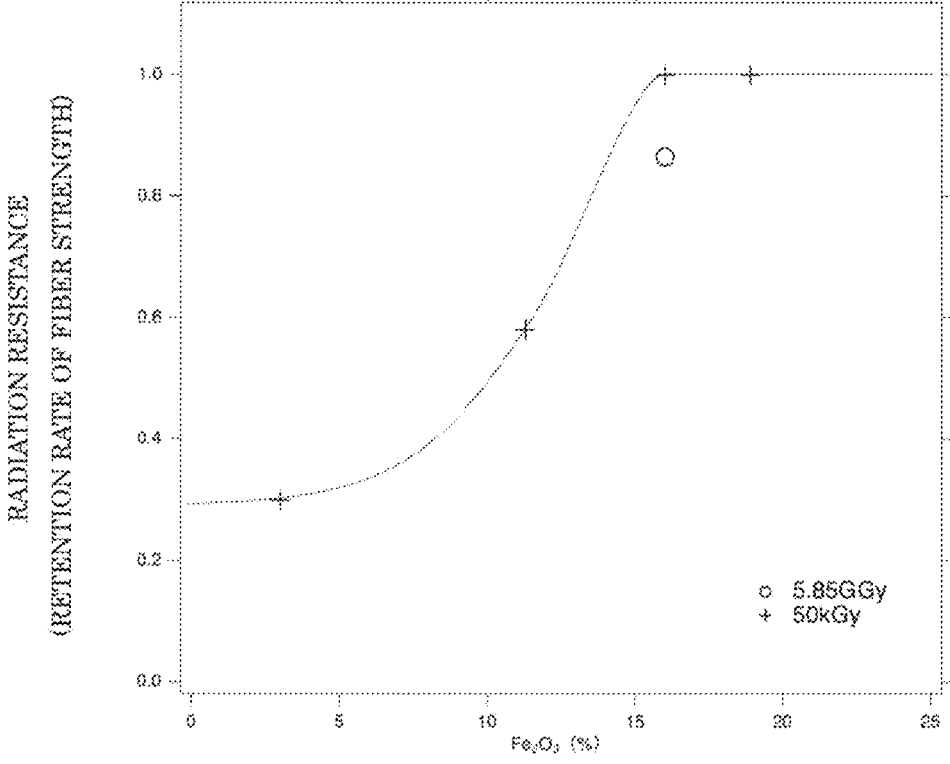
FIG. 3 is a diagram showing the relationship between the iron oxide content in an inorganic material and radiation resistance.

The results are shown in Table 5. FIG. 3 is a graph obtained by plotting the relationship between the iron oxide ($Fe_2O_3$) content in a sample and the fiber strength retention rate after radiation exposure. From this, it is clear that when the iron oxide ($Fe_2O_3$) content in the material is 15% or more, the retention rate of the tensile strength after radiation exposure becomes noticeably high.

TABLE 5

| Component in sample | Sample 1 | Sample 2 | Sample 3 | Sample 4 |
|---|---|---|---|---|
| $Fe_2O_3$ [F] | 3 | 11 | 16 | 19 |
| $SiO_2$ [S] | 51 | 52 | 48 | 42 |
| $Al_2O_3$ [A] | 12 | 18 | 12 | 14 |
| CaO [C] | 20 | 9 | 17 | 13 |
| Others | 14 | 10 | 7 | 12 |
| [S] + [A] | 63 | 70 | 60 | 56 |
| [A]/([S] + [A]) | 0.19 | 0.26 | 0.20 | 0.25 |
| [F] | 3 | 11 | 16 | 19 |
| [C] | 20 | 9 | 17 | 13 |
| Retention rate (%) of fiber strength after radiation exposure | 30 | 58 | 99 | 99 |
| Melt spinnability | A | A | A | A |

Example 1

30 parts by mass of FA(1) and 70 parts by mass of BA(1) were formulated. The present sample has the same composition as that of sample 3 used in the above-described tentative experiment. The component ratio of the present sample is [S]+[A]: 60% by mass, [A]/([S]+[A]): 0.20, [F]: 16% by mass, and [C]: 17% by mass (Table 6).

As a result of the melt spinning test, a very fine fiber (mineral fiber) having a diameter of 50 μm or less was obtained within 5 hours after the temperature inside the furnace reached 1350° C. The obtained fiber had a strength that was not likely to cause breakage even when the fiber was pulled by hand. The present fiber sample was irradiated with radiation under the following conditions.

<High Radiation Exposure Test>

The above-described fiber sample was subjected to an ultra-high dose radiation exposure test using a nuclear reactor (thermal neutron reactor, BR2) installed at the Mol Institute in Belgium. The gamma ray irradiation dose was 5.85 GGy. This irradiation dose was comparable to the radiation dose emitted by common high-level radioactive waste in about 1000 years.

The fiber sample after radiation exposure was subjected to the following XRD analysis and Vickers hardness test, together with a fiber sample that was not irradiated with radiation.

<XRD Analysis>

Figure 2:
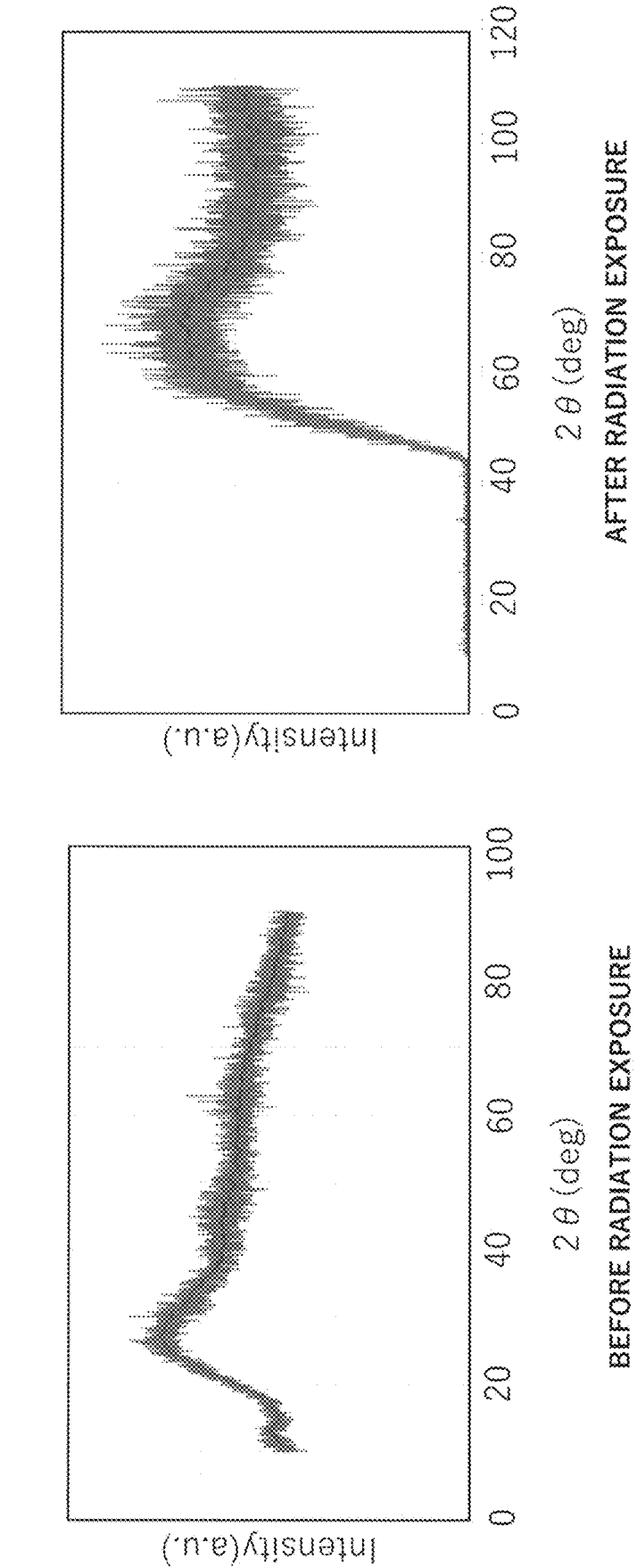
FIG. 2 shows XRD patterns respectively obtained before and after irradiation of a melt-spun fiber of an inorganic material of Example 1 with radiation.

XRD patterns of the fiber sample before and after radiation exposure are shown in FIG. 2 (before irradiation: left-hand side diagram, after irradiation: right-hand side diagram, the axis of ordinate represents diffraction intensity expressed in an arbitrary unit (a.u.)). Since there is a possibility that the sample after radiation exposure may emit radiation, only in that case, a dome-shaped shield cover with a limited opening was provided on the sample stand. This is the reason why the range of the measurement incident angle of the data (FIG. 2, right-hand side diagram) of the sample after radiation exposure is narrowed.

In both the XRD patterns of the fiber sample before radiation exposure and the fiber sample after radiation exposure, only an amorphous halo was observed, and a peak of the crystal phase was not recognized. That is, it was found that both the fiber sample before radiation exposure and the fiber sample after radiation exposure are substantially composed only of the amorphous phase, and the amorphousness was maintained even after radiation exposure.

<Vickers Hardness Test>

The fiber sample before radiation exposure and the fiber sample after radiation exposure were subjected to a Vickers hardness test.

The testing instruments used were a Reichert-Jung Micro-duromat 4000E and a Leica Telatom 3 optical microscope. Considering that the width of the fiber samples was approximately 20 μm, the force to be applied to the sample surface was set to 10 gF (0.098 N).

Measurements were performed at seventeen points in each of the samples before radiation exposure and after radiation exposure, and as a result, the Vickers hardness was $723\pm24$ kgF/mm$^2$ before radiation exposure, and $647\pm19$ kgF/mm$^2$ after radiation exposure. The Vickers hardness retention rate after irradiation was 89%, and when it is considered that the gamma ray irradiation dose was 5.85 GGy, it can be said that the retention rate has a very high value. Thus, the material has excellent radiation resistance. For comparison, the values of the retention rate (89%) obtained by the present test were plotted in FIG. 3, which was shown earlier. Although the method for measuring the strength retention rate is different, it is noteworthy that even if a sample having an iron oxide content of 16% is irradiated with an ultra-high dose of radiation, which is approximately 100,000 times the dose employed in the previously mentioned tentative experiment, the sample maintains a strength retention rate close to 90%.

Example 2

A sample was prepared at the raw material formulation ratio shown in Table 6 as Example 2. The component ratio of the present sample is such that [S]+[A]: 60% by mass, [A]/([S]+[A]): 0.25, [F]: 19% by mass, and [C]: 13% by mass (Table 6).

As a result of a melt spinning test, the sample melted and dropped within 5 hours after the temperature inside the furnace reached 1350° C., and a very fine fiber (mineral fiber) having a diameter of 50 μm or less was obtained.

Similarly to Example 1, the obtained fiber sample was substantially composed only of the amorphous phase, and even if the fiber sample was pulled by hand, the fiber sample did not easily break. Furthermore, the amorphousness is retained even after radiation exposure, and the Vickers hardness retention rate is also at the same level as in Example 1. Thus, the present material has excellent radiation resistance.

Example 3

A sample was prepared at the raw material formulation ratio shown in Table 6 as Example 3. The component ratio of the present sample is such that [S]+[A]: 56% by mass, [A]/([S]+[A]): 0.20, [F]: 18% by mass, and [C]: 25% by mass (Table 6).

As a result of a melt spinning test, the sample melted and dropped within 5 hours after the temperature inside the furnace reached 1350° C., and a very fine fiber (mineral fiber) having a diameter of 50 μm or less was obtained.

Similarly to Example 1, the obtained fiber sample was substantially composed only of the amorphous phase, and even if the fiber sample was pulled by hand, the fiber sample did not easily break. The amorphousness is retained even after radiation exposure, and the Vickers hardness retention rate is also at the same level as in Example 1. Thus, the present material has excellent radiation resistance.

Comparative Example 1 to Comparative Example 8

Samples were prepared at the raw material formulation ratios shown in Table 6 as Comparative Examples 1 to 8. None of them satisfied any one of the "four requirements of the present invention related to the composition".

As a result, none of the samples became fibrous within 5 hours after the temperature inside the furnace reached 1350° C. (Table 6).

TABLE 6

| | | Unit | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| Raw material formulation ratio | FA (1) | % by mass | 30 | — | — | — | — | — | 17 | — | — | — | — |
| | FA (2) | | — | — | — | — | — | — | — | — | 53 | 11 | — |
| | FA (3) | | — | — | — | — | 70 | — | — | — | — | — | — |
| | FA (4) | | — | — | 62 | — | — | — | — | 67 | — | — | — |
| | FA (5) | | — | 46 | — | — | — | — | — | — | — | — | 40 |
| | FA (6) | | — | — | — | 100 | — | — | — | — | — | — | — |
| | BA (1) | | 70 | 46 | — | — | — | — | — | — | — | — | 10 |
| | BA (2) | | — | — | — | — | — | 100 | — | — | — | — | — |
| | SiO₂ (reagent) | | — | — | — | — | — | — | 67 | 17 | — | 33 | — |
| | Al₂O₃ (reagent) | | — | 2 | 4 | — | — | — | — | — | 27 | 33 | 10 |
| | Fe₂O₃ (reagent) | | — | 6 | 12 | — | 30 | — | 17 | 17 | 20 | 22 | 15 |
| | CaO (reagent) | | — | — | 23 | — | — | — | — | — | — | — | 25 |
| Compositional component ratio | [S] + [A] | % by mass | 60 | 60 | 56 | 84 | 53 | 35 | 78 | 72 | 73 | 76 | 43 |
| | [A]/ ([S] + [A]) | Mass ratio | 0.20 | 0.25 | 0.20 | 0.30 | 0.24 | 0.29 | 0.02 | 0.10 | 0.55 | 0.47 | 0.42 |
| | [F] | % by mass | 16 | 19 | 18 | 14 | 34 | 18 | 19 | 23 | 23 | 23 | 21 |
| | [C] | | 17 | 13 | 25 | 1 | 2 | 3 | 3 | 2 | 0 | 0 | 32 |
| Evaluation item | Radiation resistance | | Excellent | Excellent | Excellent | Inferior | | | | | | | |
| | Melt spinnability | | A | A | A | C | C | C | B | C | C | C | C |

Examples 4 to 11

Fly ash FA(7) was selected as the silica alumina source, reagents $SiO_2$ (S), $Al_2O_3$ (A), $Fe_2O_3$ (F), and CaO (C) were additionally formulated as necessary so as to satisfy the "four requirements of the present invention related to the composition", and tests were performed (Table 7, Examples 4 to 11). All the samples exhibited excellent melt spinnability. The radiation resistance was also excellent as was found in Example 1.

TABLE 7

| | | Unit | Example 4 | Example 5 | Example 6 | Example 7 | Example 8 | Example 9 | Example 10 | Example 11 |
|---|---|---|---|---|---|---|---|---|---|---|
| Raw material formulation ratio | FA (7) | % by mass | 44 | 72 | 53 | 64 | 62 | 57 | 72 | 53 |
| | FA (8) | | — | — | — | — | — | — | — | — |
| | FA (9) | | — | — | — | — | — | — | — | — |
| | FA (10) | | — | — | — | — | — | — | — | — |
| | FA (11) | | — | — | — | — | — | — | — | — |
| | FA (12) | | — | — | — | — | — | — | — | — |
| | BA (1) | | — | — | — | — | — | — | — | — |
| | BA (2) | | — | — | — | — | — | — | — | — |
| | $SiO_2$ (reagent) | | 6 | 9 | 14 | — | 8 | 7 | 9 | 7 |
| | $Al_2O_3$ (reagent) | | — | — | — | 5 | — | — | — | — |
| | $Fe_2O_3$ (reagent) | | 15 | 12 | 14 | 13 | 12 | 18 | 13 | 11 |
| | CaO (reagent) | | 15 | 5 | 15 | 15 | 15 | 15 | 4 | 26 |
| Compositional component ratio | [S] + [A] | % by mass | 42 | 68 | 58 | 58 | 59 | 54 | 68 | 50 |
| | [A]/ ([S] + [A]) | Mass ratio | 0.20 | 0.20 | 0.17 | 0.30 | 0.20 | 0.20 | 0.20 | 0.20 |
| | [F] | % by mass | 19 | 18 | 19 | 19 | 18 | 23 | 19 | 16 |
| | [C] | | 17 | 7 | 17 | 17 | 17 | 17 | 7 | 28 |
| Evaluation item | Radiation resistance | | Excellent | Excellent | Excellent | Excellent | Excellent | Excellent | Excellent | Excellent |
| | Melt spinnability | | A | A | A | A | A | A | A | A |

Fly ash FA(7) was selected as the silica alumina source, reagents $SiO_2$ (S), $Al_2O_3$ (A), $Fe_2O_3$ (F), and CaO (C) were additionally formulated, and tests were performed (Table 8, Comparative Examples 9 to 16). All of Comparative Examples 9 to 16 did not satisfy any one of the "four requirements of the present invention related to the composition".

When the value of [S]+[A] is less than the lower limit of the requirement i), the viscosity of the molten product is too low, and as a result, a thread cannot be formed (Comparative Example 9). On the other hand, when the value of [S]+[A] is more than the upper limit of the requirement i), since the viscosity of the molten product is too high, the molten product does not exhibit the behavior of dropping due to gravity, which is a prerequisite for thread formation, and a thread cannot be formed (Comparative Example 10).

Even in a case where the value of [A]/([S]+[A]) is less than the lower limit of the requirement ii), the viscosity of the molten product is too low, and as a result, a thread cannot be formed (Comparative Example 11). On the other hand, even in a case where the value of [A]/([S]+[A]) is more than the upper limit of the requirement ii), since the viscosity of the molten product is too high, the molten product does not exhibit the behavior of dropping caused by gravity, which is a prerequisite for thread formation (Comparative Example 12).

Figure 4:
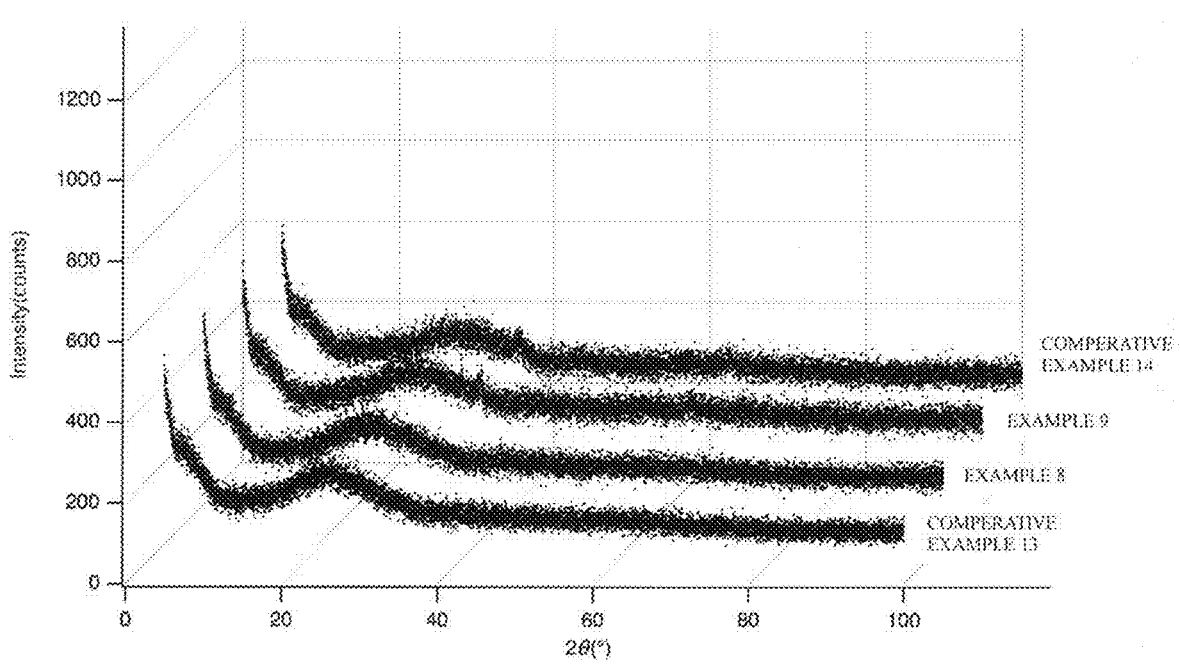
FIG. 4 is a diagram showing various examples of XRD patterns of inorganic fibers of certain of the Examples and Comparative Examples.
Figure 4:
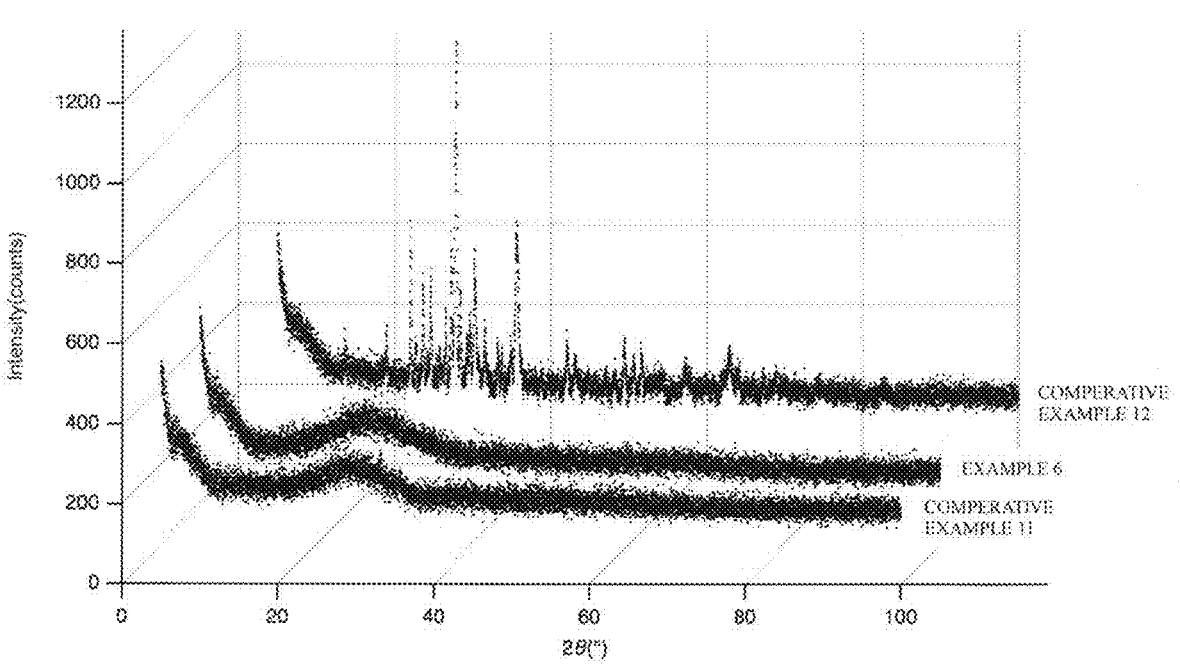

As a result of the X-ray diffraction (XRD) pattern, in Comparative Example 12, formation of a crystal phase was recognized, which was considered to be attributable to an $Al_2O_3$-rich phase (FIG. 4).

When the value of [F] is less than the lower limit of the requirement iii), the radiation resistance is poor (Comparative Example 13). On the other hand, when the value of [F] is more than the upper limit of the requirement iii), the viscosity of the molten product is too low, and as a result, a thread cannot be formed (Comparative Example 14).

When the value of [C] is less than the lower limit of the requirement iv), the viscosity of the molten product is too low, and as a result, a thread cannot be formed (Comparative example 15). On the other hand, when the value of [C] is more than the upper limit of the requirement iv), since the viscosity of the molten product is too high, a thread cannot be formed (Comparative Example 16).

TABLE 8

| | | Unit | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|---|
| Raw material formulation ratio | FA (7) | % by mass | 40 | 76 | 32 | 53 | 66 | 53 | 74 | 49 |
| | FA (8) | | — | — | — | — | — | — | — | — |
| | FA (9) | | — | — | — | — | — | — | — | — |
| | FA (10) | | — | — | — | — | — | — | — | — |
| | FA (11) | | — | — | — | — | — | — | — | — |
| | FA (12) | | — | — | — | — | — | — | — | — |
| | BA (1) | | — | — | — | — | — | — | — | — |
| | BA (2) | | — | — | — | — | — | — | — | — |
| | $SiO_2$ (reagent) | | 5 | 10 | 19 | — | 9 | 7 | 10 | 6 |
| | $Al_2O_3$ (reagent) | | — | — | — | 14 | — | — | — | — |
| | $Fe_2O_3$ (reagent) | | 15 | 9 | 20 | 14 | 8 | 22 | 12 | 12 |
| | CaO (reagent) | | 15 | 3 | 25 | 15 | 15 | 15 | 0 | 30 |
| Compositional component ratio | [S] + [A] | % by mass | 38 | 72 | 44 | 58 | 63 | 50 | 70 | 46 |
| | [A]/ ([S] + [A]) | Mass ratio | 0.20 | 0.20 | 0.13 | 0.42 | 0.20 | 0.20 | 0.20 | 0.20 |
| | [F] | % by mass | 19 | 16 | 23 | 19 | 14 | 27 | 19 | 16 |
| | [C] | | 17 | 5 | 26 | 17 | 17 | 17 | 3 | 32 |
| Evaluation item | Radiation resistance | | | | | | Inferior | | | |
| | Melt spinnability | | D | B | D | B | A | D | B | D |

Next, formulations wherein most of the silica alumina source, the iron oxide source, and the calcium oxide source were composed of thermal power generation waste (fly ash and clinker ash) and metal refining waste (iron and steel slag and copper slag), or volcanic rock, which is a natural resource, were attempted (Table 9, Examples 12 to 18).

All of the formulations satisfied the "four requirements of the present invention related to the composition" and had excellent melt spinnability. The radiation resistance was also superior.

TABLE 9

| | | Unit | Example 12 | Example 13 | Example 14 | Example 15 | Example 16 | Example 17 | Example 18 |
|---|---|---|---|---|---|---|---|---|---|
| Raw material formulation ratio | FA (7) | % by mass | — | — | 50 | — | — | 30 | 45 |
| | FA (8) | mass | 50 | — | — | — | — | — | — |
| | FA (9) | | — | 33 | — | — | — | — | — |
| | FA (10) | | — | — | 30 | — | 40 | 30 | 25 |
| | FA (11) | | — | — | — | 33 | — | — | — |
| | FA (12) | | — | — | — | — | 50 | — | — |
| | FA (13) | | — | — | — | — | — | 18 | — |
| | FA (14) | | — | — | — | — | — | — | 10 |
| | BA (1) | | 50 | 67 | 7.5 | 67 | 2.5 | 22 | 20 |
| | BA (2) | | — | — | — | — | — | — | — |
| | $SiO_2$ (reagent) | | — | — | — | — | — | — | — |
| | $Al_2O_3$ (reagent) | | — | — | — | — | — | — | — |
| | $Fe_2O_3$ (reagent) | | — | — | — | — | — | — | — |
| | CaO (reagent) | | — | — | 12.5 | — | 7.5 | — | — |
| Compositional component ratio | [S] + [A] | % by mass | 62 | 61 | 56 | 48 | 65 | 56 | 61 |
| | [A]/ ([S] + [A]) | Mass ratio | 0.20 | 0.20 | 0.20 | 0.19 | 0.21 | 0.21 | 0.22 |
| | [F] | % by mass | 16 | 18 | 22 | 17 | 23 | 21 | 22 |
| | [C] | | 14 | 14 | 16 | 17 | 9 | 16 | 11 |
| Evaluation item | Radiation resistance | | Excellent | Excellent | Excellent | Excellent | Excellent | Excellent | Excellent |
| | Melt spinnability | | A | A | A | A | A | A | A |

FIG. 4 shows XRD patterns of a series of molten samples.

Samples in which the value of [A]/([S]+[A]) does not exceed the upper limit of the requirement ii) of the present invention (Comparative Example 11 and Example 6) are amorphous; however, in Comparative Example 12 in which the value is more than the upper limit of the requirement ii), formation of a crystal phase is recognized, which is considered to be attributable to an $Al_2O_3$-rich phase.

Furthermore, even if the value of [F] changed to a range near the upper limit of the requirement iii) of the present invention, the material was amorphous (Comparative Example 13, Examples 8 and 9, and Comparative Example 14).

Figure 5:
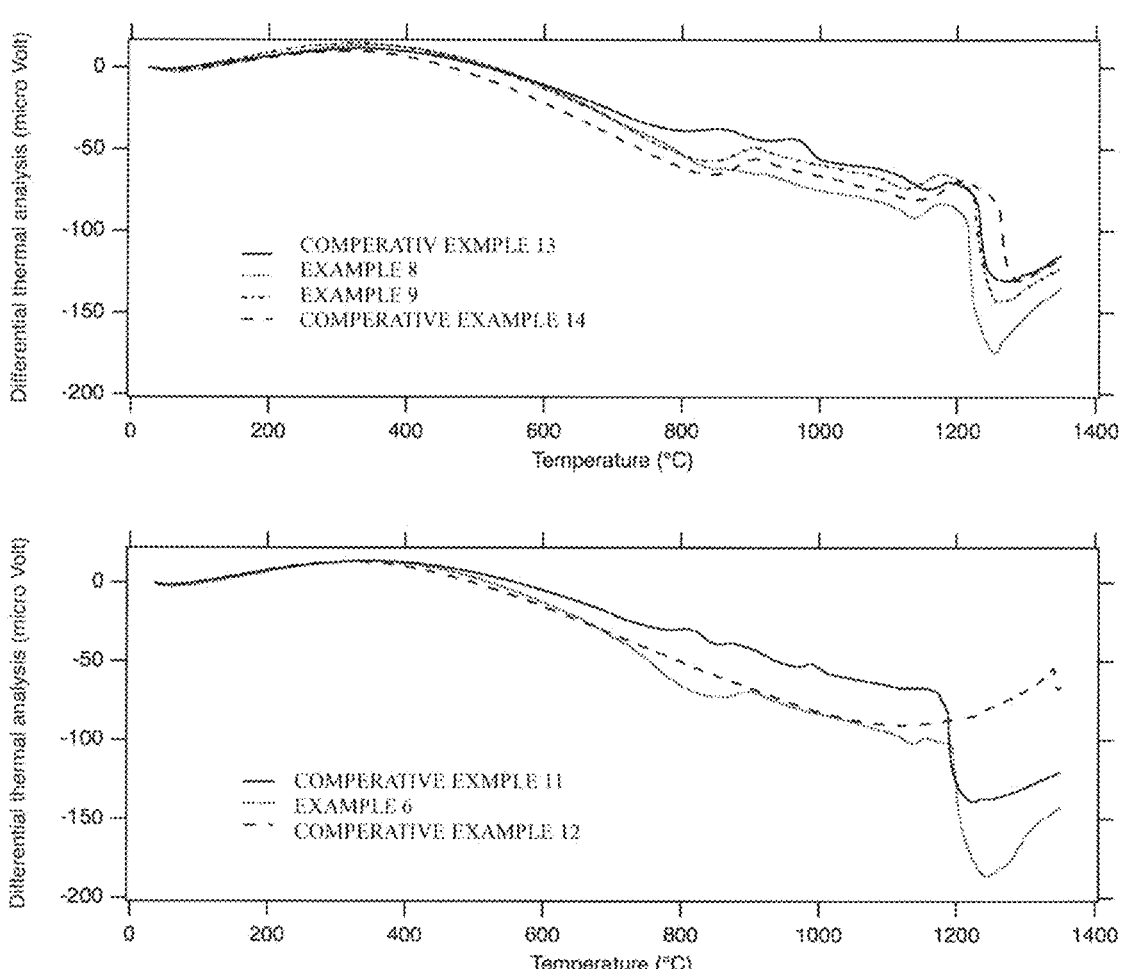
FIG. 5 is a diagram showing various examples of a DTA curve obtained by differential thermal analysis of the inorganic fibers of certain of the Examples and Comparative Examples.

FIG. 5 shows thermograms (DTA curves) obtained by differential thermal analysis of inorganic fibers obtained in a series of tests.

The inorganic fibers of the present invention were thermally stable up to about 800° C. (at least a temperature close to 700° C.), and the melting temperature is 1200° C. or higher.

INDUSTRIAL APPLICABILITY

The inorganic material of the present invention has excellent radiation resistance and can therefore be utilized in the field of nuclear power, the field of aerospace, and the field of medicine.

When the inorganic material is used at parts to be irradiated with radiation in the facilities, instruments, and members used in these fields, radiation-induced deterioration of these parts to be irradiated with radiation can be suppressed.

Examples of the facilities, instruments, and members in the field of nuclear power include:

facilities, instruments, and members for nuclear power generation;

facilities, instruments, and members for mining and processing uranium ores;

facilities, instruments, and members for secondary processing treatment of nuclear fuel (including conversion, concentration, reconversion, molding processing, and MOX manufacturing of the same fuel);

facilities, instruments, and members for storage, treatment, and retreatment of used nuclear fuel;

facilities, instruments, and members for storage, treatment, and disposal of radioactive waste;

transport instruments and members for uranium ores, secondary processing products of nuclear fuel, used nuclear fuels, or radioactive waste; and other nuclear-related facilities, instruments, and members.

More specific examples of the facilities, instruments, and members for nuclear power generation include nuclear reactor buildings (including research reactors and test reactors), a nuclear reactor containment vessel, piping inside a nuclear reactor facility, and a decommissioning robot.

Examples of the facilities, instruments, and members used in the field of aerospace include a space station building, a space station, an artificial satellite, a planetary exploration satellite, and a space suit.

Examples of the facilities, instruments, and members used in the field of medicine include medical devices that utilize particle beams.

Since the inorganic material of the present invention has excellent melt spinnability, the inorganic material is suitable for inorganic fibers for a fiber-reinforced composite material. Furthermore, depending on the use application, the inorganic material can be processed into roving, chopped strands, woven fabrics, prepregs, nonwoven fabrics, and the like. Examples of a base material (material to be reinforced with fibers) of the above-described composite material include resins and cement. Known thermoplastic resins and thermosetting resins can be used as the resins.

Another example of use of the inorganic material of the present invention is the use as a material for three-dimensional printing. That is, when a kneading product of a powder of the inorganic material of the present invention as well as a wax, a resin, and other carriers is used as a material for three-dimensional printing, it is possible to produce a member having excellent radiation resistance without limitations in the shape.

The above-described use examples have been given only for the purpose of demonstrating the usefulness of the present invention and are not intended to limit the scope of the present invention.

EXPLANATIONS OF LETTERS OR NUMERALS

1 ELECTRIC FURNACE
2 TAMMANN TUBE
3 HANGING ROD
4 OPENING
5 FIBER
D OUTER DIAMETER OF ELECTRIC FURNACE
H HEIGHT OF ELECTRIC FURNACE
d OPENING DIAMETER OF ELECTRIC FURNACE

The invention claimed is:

1. A fiber having radiation resistance comprising an inorganic material, wherein the inorganic material comprises $SiO_2$, $Al_2O_3$, CaO, and $Fe_2O_3$ as components, wherein the mass percentages of the components in terms of oxide in the inorganic material are as follows:

i) the total content of $SiO_2$ and $Al_2O_3$ is from 40% by mass to 70% by mass;

ii) the ratio $Al_2O_3/(SiO_2+Al_2O_3)$ (mass ratio) is in the range of 0.15 to 0.40;

iii) the content of $Fe_2O_3$ is from 21% by mass to 25% by mass; and iv) the content of CaO is from 5% by mass to 25% by mass.

2. The fiber according to claim 1, wherein the content of CaO is from 5% by mass to 17% by mass.

3. The fiber according to claim 1, wherein the content of $Fe_2O_3$ is from 21% by mass to 23% by mass.

4. A fiber-reinforced composite material reinforced with the fiber according to claim 1.

5. The fiber-reinforced composite material according to claim 4, wherein the fiber-reinforced composite material is a fiber-reinforced resin.

6. The fiber-reinforced composite material according to claim 4, wherein the fiber-reinforced composite material is a fiber-reinforced cement.

7. A method for suppressing radiation-induced deterioration of a fiber-reinforced composite material comprising a base material and a fiber and constituting a part to be irradiated with radiation, the method comprising adding the inorganic fiber of claim 1 as said fiber to the base material.

8. The method for suppressing radiation-induced deterioration according to claim 7, wherein the content of CaO is from 5% by mass to 17% by mass.

9. The method for suppressing radiation-induced deterioration according to claim 7, wherein the content of $Fe_2O_3$ is from 21% by mass to 23% by mass.

10. A method for producing an inorganic fiber having radiation resistance, the method comprising melt-spinning a mixture of a silica source, an alumina source, a calcium oxide source, and an iron oxide source, wherein the mass percentages of $SiO_2$, $Al_2O_3$, CaO, and $Fe_2O_3$ in terms of oxide in the mixture are as follows:

i) the total content of $SiO_2$ and $Al_2O_3$ is from 40% by mass to 70% by mass;

ii) the ratio $Al_2O_3/(SiO_2+Al_2O_3)$ (mass ratio) is in the range of 0.15 to 0.40;

iii) the content of $Fe_2O_3$ is from 21% by mass to 25% by mass; and iv) the content of CaO is from 5% by mass to 25% by mass.

11. The method for producing an inorganic fiber according to claim 10, wherein the content of CaO is from 5% by mass to 17% by mass.

12. The method for producing an inorganic fiber according to claim 10, wherein the content of $Fe_2O_3$ is from 21% by mass to 23% by mass.

13. The method for producing an inorganic fiber according to claim 10, wherein the inorganic fiber is used for a part to be irradiated with radiation.

14. The method for producing an inorganic fiber according to claim 10, wherein fly ash is used as the silica source or the alumina source.

15. The method for producing an inorganic fiber according to claim 14, wherein the iron oxide source is copper slag.

16. The method for producing an inorganic fiber according to claim 15, wherein the calcium oxide source is iron and steel slag.

17. The method for producing an inorganic fiber according to claim 10, wherein the silica source or the alumina source is basalt or andesite.

18. The method for producing an inorganic fiber according to claim 17, wherein the iron oxide source is copper slag.

19. The method for producing an inorganic material fiber according to claim 18, wherein the calcium oxide source is iron and steel slag.

20. A part to be irradiated with radiation, the part comprising a fiber having radiation resistance, the fiber comprising an inorganic material, wherein the inorganic material comprises $SiO_2$, $Al_2O_3$, CaO, and $Fe_2O_3$ as components, wherein the mass percentages of the components in terms of oxide in the inorganic material are as follows:

i) the total content of $SiO_2$ and $Al_2O_3$ is from 40% by mass to 70% by mass;

ii) the ratio $Al_2O_3/(SiO_2+Al_2O_3)$ (mass ratio) is in the range of 0.15 to 0.40;

iii) the content of $Fe_2O_3$ is from 21% by mass to 25% by mass; and iv) the content of CaO is from 5% by mass to 25% by mass.

21. The part according to claim 20, wherein the content of CaO is from 5% by mass to 17% by mass.

22. The part according to claim 20, wherein the content of $Fe_2O_3$ is from 21% by mass to 23% by mass.

23. The part according to claim 20, wherein the part to be irradiated with radiation is any one of the following:

a) a nuclear reactor building, a nuclear reactor containment vessel, piping inside a nuclear reactor facility, and a decommissioning robot;

b) a space station building, a space station, an artificial satellite, a planetary exploration satellite, and a space suit; and c) medical devices utilizing particle beams.

* * * * *